Aug. 11, 1936. E. OLSSON Re. 20,065
PREPARATION OF FIBROUS MATERIAL
Original Filed Nov. 6, 1933
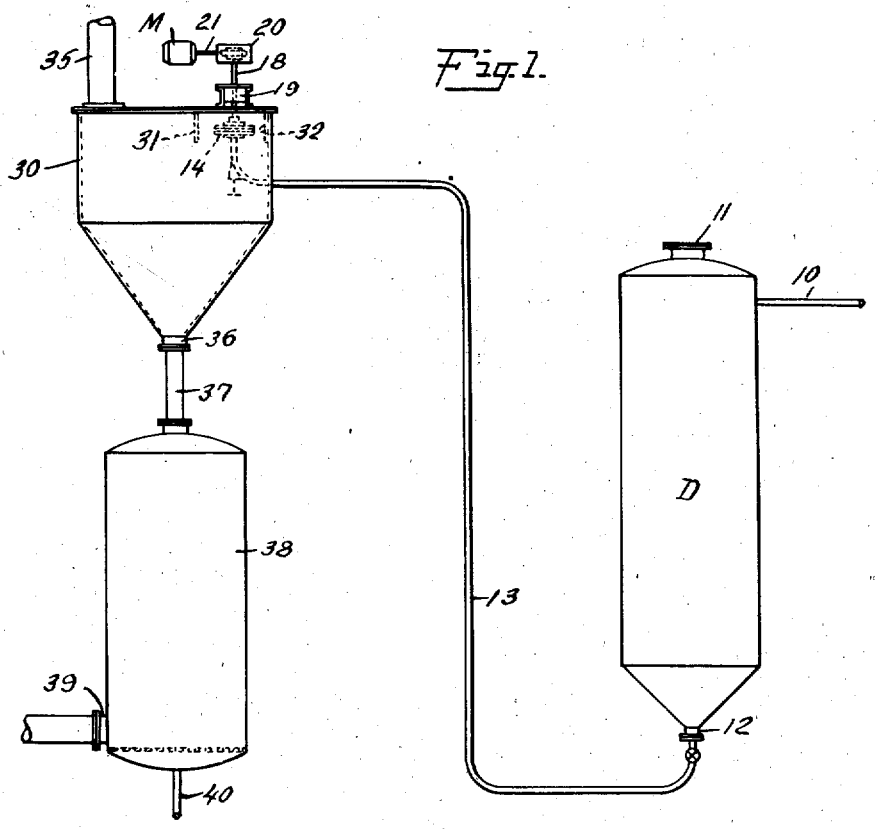
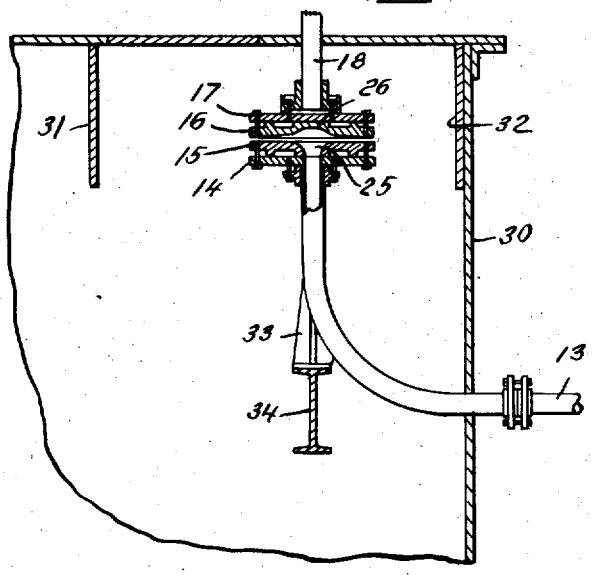
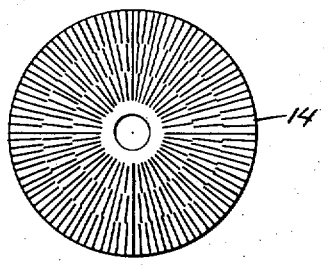
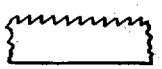
INVENTOR
Elis Olsson
BY
Marshall & Hawley
ATTORNEYS Reissued Aug. 11, 1936

Re. 20,065

UNITED STATES PATENT OFFICE 20,065

PREPARATION OF FIBROUS MATERIAL

Elis Olsson, West Point, Va.

Original No. 2,006,559, dated July 2, 1935, Serial No. 696,797, November 6, 1933. Application for reissue April 10, 1936, Serial No. 73,815

5 Claims. (Cl. 92—6)

This invention relates to the preparation of fibrous material for use in making paper products such as paper webs or sheets, cardboard or like products.

Pulp is usually digested by low pressure steam and suitable treating liquor and is then discharged from the digester, washed and ground to the desired fineness. These operations require a considerable amount of time.

This invention has for its salient object to provide apparatus for treating fibrous material so constructed and arranged that the time required for the treatment will be materially reduced.

Another object of the invention is to provide an apparatus of the character described so constructed and arranged that high pressure used in the digester can be utilized to force the material through the grinder or pulverizer.

A further object of the invention is to provide a process of treating fibrous material so worked out that the pressure from the digester is utilized to force the material through the grinding mechanism.

Further objects of the invention will appear from the following specification taken in connection with the drawing which forms a part of this application, and in which Fig. 1 is a diagrammatic elevational view showing apparatus constructed in accordance with the invention;

Fig. 2 is an enlarged detail sectional elevation showing the grinding mechanism;

Fig. 3 is a top plan view of one of the grinding plates; and

Fig. 4 is a fragmentary edge view of a portion of one of the grinding plates.

The invention briefly described comprises a digester into which high pressure steam is introduced and having a discharge outlet through which the digested material and liquor are discharged or "blown" when the material has been sufficiently digested. The discharge outlet of the digester is connected by a conduit to the grinding apparatus, the digested material being conducted through the conduit by the force of the high pressure in the digester and being forced between the grinding elements. The digester operation is very materially shortened by the use of the high pressure steam and the use of this steam to force the material through the grinding mechanism further reduces the time required for carrying out the treatment of the fibrous material.

Further details of the invention will appear from the following description.

In the particular form of apparatus illustrated in the drawing there is shown diagrammatically in Fig. 1 a digester D having an inlet opening 10 which is connected to a source of high pressure steam and a charging opening 11 through which the fibrous material to be digested is received. The digester also has a discharge opening 12 which is connected by a conduit 13 to a plate 14 which forms a support for one of a pair of grinding plates 15. The other plate 16 is supported by a supporting plate 17 in a position above the plate 15. The plate support 17 is carried by a shaft 18 having thrust supporting bearings 19 and extending upwardly through the thrust bearings to drive transmitting mechanism 20 which is connected to a motor M by a shaft 21. The upper grinding plate 16 is thus positively driven by the motor and the lower plate is shown as stationary, although if desired this plate may also be rotated but in a direction opposite to the direction of rotation of the plate 16. The plate 15 has a central opening 25 through which the material is fed and the upper plate 16 has a central dome 26. The plates are preferably spaced slightly apart, the amount of spacing being determined by a vertical adjustment of the upper plate.

The grinding plates may be of any suitable construction but are preferably serrated or roughened, as shown in Fig. 3.

The grinding mechanism is housed in a casing 30 and baffle plates 31 and 32 are disposed on opposite sides of the grinding mechanism. The plate support 14 is mounted on a bracket 33 carried by a frame member 34. A vent pipe 35 extends upwardly from the casing or tank 30 to relieve the pressure in the tank or casing.

The casing 30 has an outlet opening 36 at the bottom thereof which is connected by a conduit 37 to a diffuser or washing mechanism 38 having a discharge opening 39 and an outlet conduit 40 through which the liquid can escape from the diffuser.

*Operation*

After the digester has been charged and the material therein has been treated under high pressure for a relatively short time the discharge outlet 12 is opened permitting the treated material to be forced under the high pressure in the digester through the conduit 13 to the grinding mechanism and outwardly between the grinding plates 15 and 16. By these plates the material is ground or pulverized to the desired extent and passes through the outlet opening 36 of the casing 30 and through the conduit 37 into the diffuser where it is washed.

From the foregoing description it will be evident that the apparatus described will effectively and expeditiously treat fibrous material.

By the use of this process and apparatus the time normally required for the digestion of the pulp is materially cut down or reduced since partial digestion is sufficient and complete digestion is unnecessary.

Although one specific embodiment of the invention has been particularly shown and described it will be understood that the invention is capable of modification and that changes in the construction and in the arrangement of the various cooperating parts may be made without departing from the spirit or scope of the invention, as expressed in the following claims.

What I claim is:

1. Apparatus for treating fibrous material comprising a digester means for supplying high pressure steam thereto, said digester having a discharge outlet, a pulp receiving chamber, a grinder mounted in said chamber and comprising a pair of elements arranged to coact and grind the material, a conduit arranged to conduct the material from the digester outlet after the material is digested to a position between said elements, the material being forced through said conduit and between said elements by the pressure in the digester when the discharge outlet is opened, and means for rotating one of said grinding elements.

2. Apparatus for treating fibrous material comprising a digester, means for supplying high pressure steam thereto, said digester having a discharge outlet, a pulp receiving chamber, a grinder mounted in said chamber and comprising a pair of grinding plates, arranged to coact and grind the material, a conduit arranged to conduct the material from the digester outlet after the material is digested to a position between the central portions of said plates, the material being forced through said conduit and outwardly between said plates by the pressure in the digester when the discharge outlet is opened, and means for rotating one of said grinding plates.

3. Apparatus for treating fibrous material comprising a digester, means for supplying high pressure steam thereto, said digester having a discharge outlet, a pulp receiving chamber, a grinder mounted in said chamber and comprising a pair of spaced elements disposed above the level of the discharge outlet and arranged to coact and grind the material, a conduit arranged to conduct the material from the digester outlet after the material is digested to a position between said elements, the material being forced through said conduit and between said elements by the pressure in the digester when the discharge outlet is opened, and means for rotating one of said grinding elements.

4. Apparatus for treating fibrous material comprising a digester having a discharge outlet, means for supplying high pressure steam thereto, a pulp chamber, a pair of grinding plates therein, one plate having an opening for receiving the material to be ground, a conduit for conducting the treated material from the digester outlet after the material is digested to said opening, the pressure in the digester forcing the material through said conduit to the grinding plates, and means for rotating one of said plates.

5. The process of treating fibrous material which consists of digesting the material under high pressure and utilizing the digester pressure to force the material to and through grinding mechanism when the digester charge is blown from the digester.

ELIS OLSSON.